S. T. Sanford,
Stringing Fruit.
No. 37,708. Patented Feb. 17, 1863.
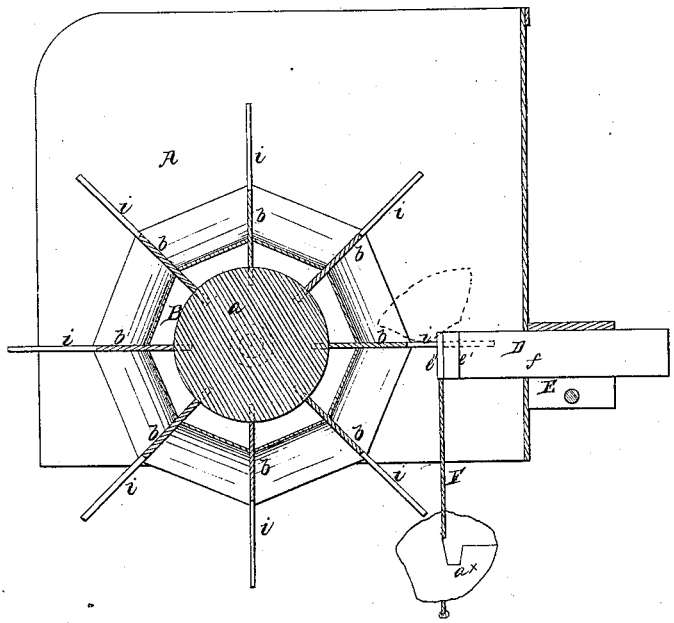
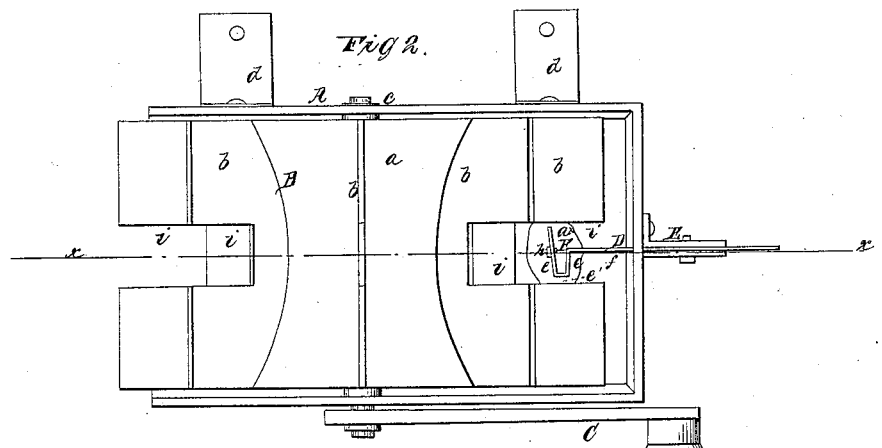
Witnesses.
G. W. Reed
M. M. Livingston
Inventor.
S. T. Sanford
per Munn & Co.
Attorneys

UNITED STATES PATENT OFFICE.

SAMUEL T. SANFORD, OF FALL RIVER, MASSACHUSETTS.

IMPROVED MACHINE FOR STRINGING DRIED APPLES AND OTHER FRUIT.

Specification forming part of Letters Patent No. 37,708, dated February 17, 1863.

*To all whom it may concern:*

Be it known that I, S. T. SANFORD, of Fall River, in the county of Bristol and State of Massachusetts, have invented a new and useful Device for Stringing Fruit; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig 2, a plan or top view of the same; Fig. 3, a detached end view of the knife pertaining to the same.

Similar letters of reference indicate corresponding parts in the several figures.

This invention relates to a new and useful device for stringing fruit preparatory to drying the same; and it consists in the employment or use of a knife constructed in a peculiar manner so as to admit of a string being attached to it, said parts being so arranged that the fruit may be fed to the knife in quarters or in pieces of a suitable dimension, and forced down upon the knife and on the string, the knife serving as a needle to string the fruit.

The invention further consists in the employment or use of a revolving hopper placed within a suitable box, and arranged in relation with the knife, whereby the fruit may be fed to the knife with the greatest facility.

To enable those skilled in the art to fully understand and construct my invention, I will proceed to describe it.

A represents a box, in which a revolving hopper, B, is placed. This hopper is formed of a concave hub, $a$, having a series of radial plates, $b$, attached to it, at equal distance apart, as shown in Fig. 1. The plates $b$, it will be seen, form a series of compartments, the hub $a$ forming a concave bottom for each one of them. The shaft $c$ of the hub $a$ has its bearings in the sides of the box A, and the length of the hub, as well as the width of the plates, is nearly equal to the width of the interior of the box A. The shaft $c$ is provided at one end with a crank, C, which is at the outer side of the box A, and the box at one side is provided with brackets $d\,d$, through which screws pass to secure it to any proper fixture.

D represents a knife, which is constructed of a piece of flat steel, having one end bent so as to form three planes, $e\ e'\ e''$, the plane $e$ being at right angles to the main portion $f$ of the steel plate, the plane $e'$ being at right angles to $e$ and in a line parallel with $f$, but projecting beyond it, and the plane $e''$ forming an obtuse angle with $e'$, and projecting past the end of $f$, as shown clearly in Fig. 2. This knife D extends within the box A, the part $f$ being secured in a socket, E, attached to the end of the box A. In the part or plane $e''$ of the knife D there is made an oblique slot, $g$, as shown clearly in Fig. 3. This slot is for the purpose of securing a string, F, to the knife, which is done by tying a knot, $h$, in one end of the string, and then passing the latter into the slot $g$, and drawing it down until the knot $h$ comes in contact with the part or plane $e''$ of the knife, as will be fully understood by referring to Fig. 3. The plates $b$ of the revolving hopper B have each a rectangular slot, $i$, made in them, to admit of the hopper revolving without coming in contact with the knife, the ends of the plates $b$ extending some distance beyond the knife, as fully shown in Fig. 2.

The operation is as follows: The fruit to be strung is quartered or cut into pieces $a^\times$, of suitable dimensions, and placed in the compartments of the hopper B as the latter is rotated through the medium of the crank C. The pieces of fruit, by the rotation of the hopper, are driven or forced down upon the bent end of the knife D, and the latter passes through them, the fruit passing down on the string, which fits in the hole made by the knife. (See Fig. 1.) This result is attained, as will be seen by referring to the figure aforesaid, in consequence of the peculiar form of the knife D and the attachment of the string F to it. In consequence of this arrangement each piece of fruit cannot fail to be strung when it is forced past the knife. The pieces of fruit are shoved down on the string F by the action of the hopper. They do not require to be forced down upon it by hand. By this simple arrangement fruit may be very rapidly strung, and in a secure manner, or so that they cannot become casually detached from the string.

Having thus described my invention, what I claim as new, and desire to secure by Letters Patent, is—

1. A knife, D, constructed or bent in the form substantially as shown, in combination with a string, F, the latter being attached to the former, and both arranged to operate as and for the purpose set forth.

2. In combination with the knife D and string F, the revolving hopper B and box A, all constructed and arranged for joint operation, as and for the purpose specified.

SAMUEL T. SANFORD.

Witnesses:
   STEPHEN A. WOOD,
   CHARLES D. CUMMINGS.